July 1, 1941.  F. VON SCHLEGELL  2,247,534
TRACTOR HITCH
Filed Nov. 30, 1939  3 Sheets-Sheet 1
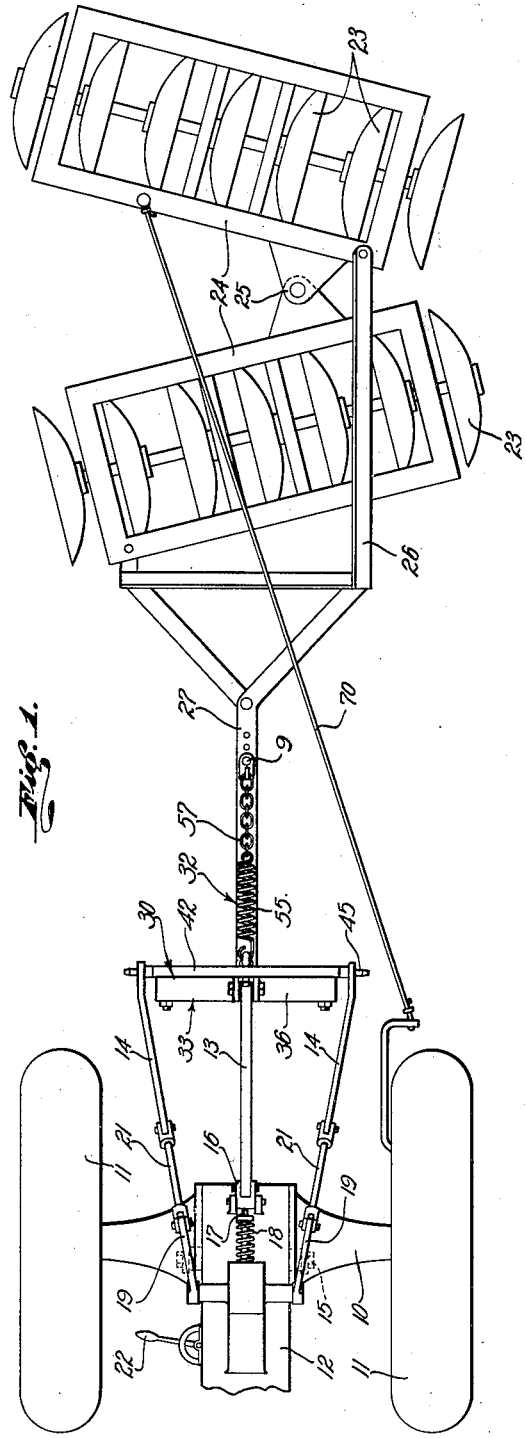
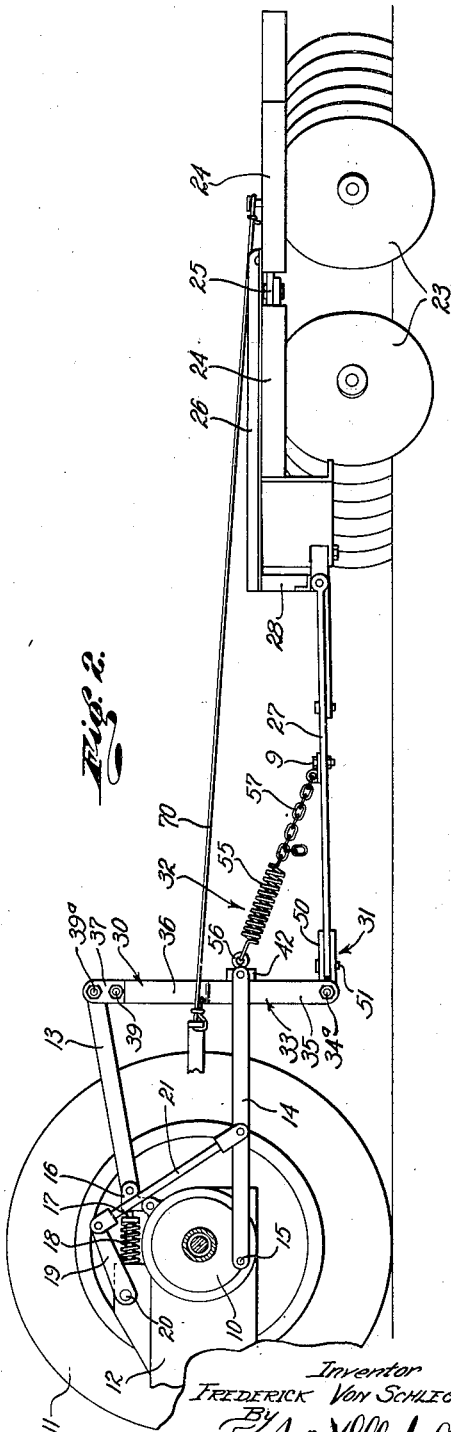
Inventor
FREDERICK VON SCHLEGELL
By
His Attorney

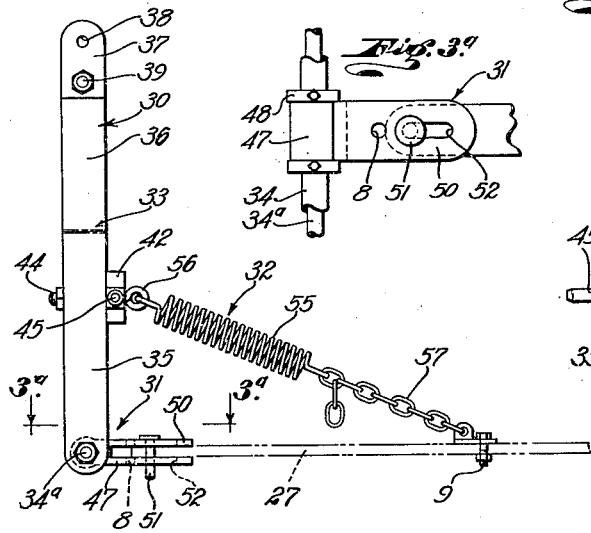
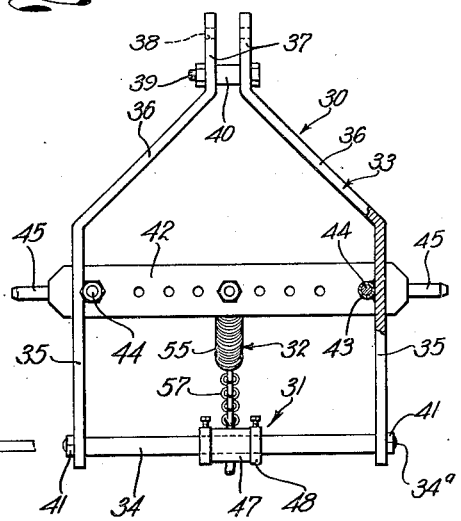
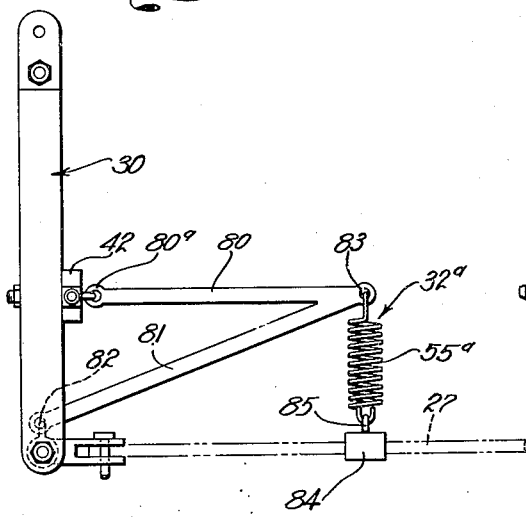
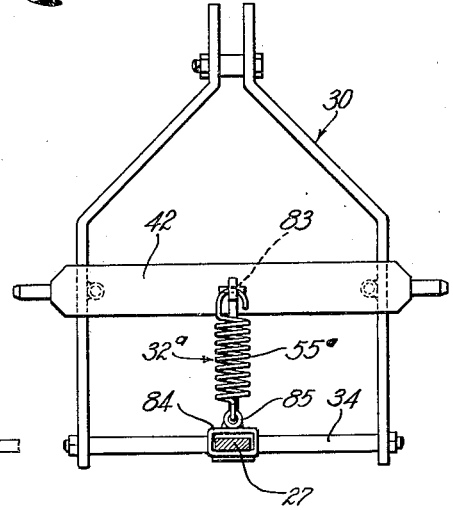

July 1, 1941.  F. VON SCHLEGELL  2,247,534
TRACTOR HITCH
Filed Nov. 30, 1939  3 Sheets-Sheet 3
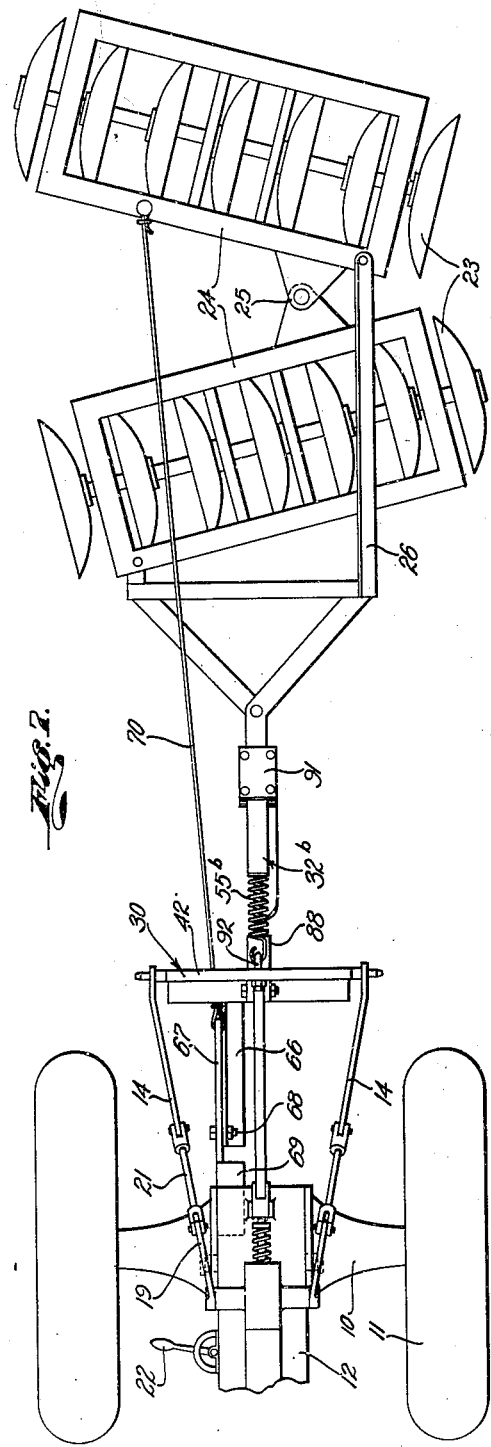
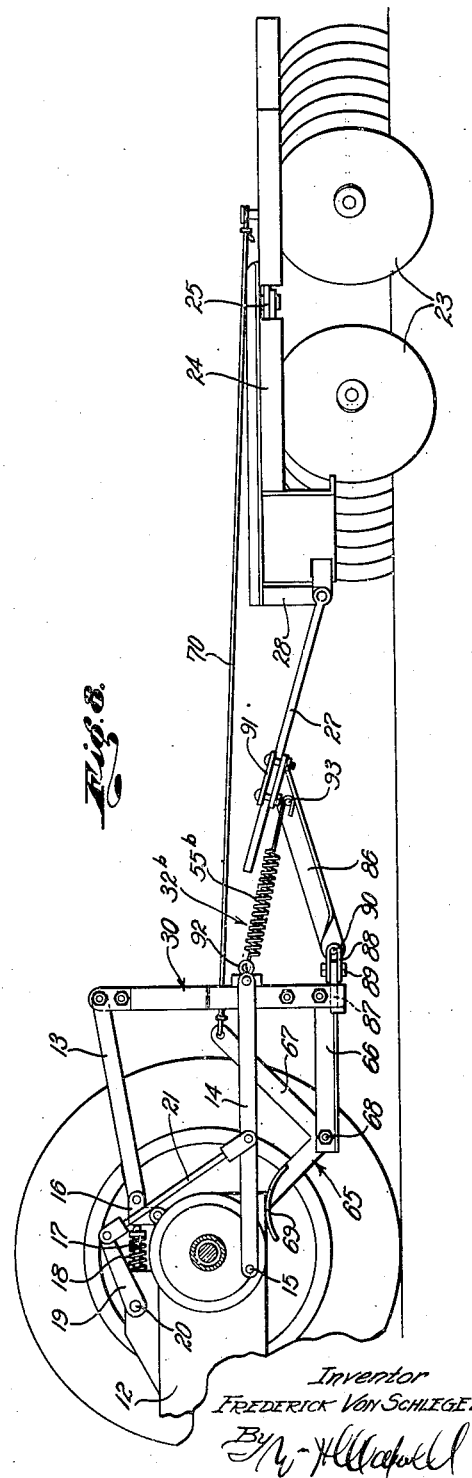
Inventor
FREDERICK VON SCHLEGELL
By
His Attorney Patented July 1, 1941

2,247,534

UNITED STATES PATENT OFFICE 2,247,534

TRACTOR HITCH

Frederick von Schlegell, Pasadena, Calif.

Application November 30, 1939, Serial No. 306,906

20 Claims. (Cl. 55—83)

This invention relates to devices for coupling agricultural implements and the like to tractors, and other draft means, and relates more particularly to devices of this nature to be employed in conjunction with implement raising or controlling means associated with the tractors or draft means.

Controls have been embodied in or applied to tractors for automatically controlling the depth of cut or action of the implement drawn by the tractor and for applying the downward force resulting from the "suction" or digging action of the implement to the tractor to increase the traction of the same. Such controls have proven very satisfactory in operating plows and other implements having a substantial "suction" or tendency to dig downward, but are not entirely satisfactory in controlling harrows and other drawn implements or vehicles whose principal resistance to forward advancement is generally horizontal.

A general object of this invention is to provide a simple, practical and very effective coupling means for connecting a harrow or other drawn implement, offering a resistance that is substantially horizontal, to an automatic control of the character referred to above, which coupling means assures the desired automatic control of the implement and the utilization of a portion of the weight of the implement for the increase in traction of the tractor.

Another and important object of this invention is to provide a coupling means or hitch of the character mentioned embodying a novel structure for utilizing a portion of the weight of the drawn implement, to augment the traction load of the draft means or tractor.

Another object of this invention is to provide a coupling means of the character mentioned that is simple and compact and readily applied to the tractor in its cooperative relation to the automatic control.

Another object of this invention is to provide a coupling means of the character mentioned that may embody a structure for automatically changing the angle of cut of the harrow discs or other active parts of the drawn implement in response to variations in the resistance to forward movement of the implement due to variations in the character of the soil, etc., which structure is also useful in "closing" the harrow sections while making turns, etc.

A further object of this invention is to provide a coupling means of the character mentioned that is adapted for the ready and convenient attachment of drawn implements of various natures.

The various objects and features of my invention will be fully understood from the following detailed description of typical preferred forms and applications of the invention, throughout which description reference is made to the accompanying drawings, in which:

Fig. 1 is a top or plan view of one form of coupling means of the invention showing the manner in which it may connect a conventional disc harrow with a hydraulic or automatic control on a tractor of conventional design. Fig. 2 is a vertical sectional view of the structure shown in Fig. 1 with the harrow in side elevation. Fig. 3 is an enlarged side elevation of the coupling means of the present invention disconnected from the tractor and illustrating the manner in which it may be connected with the drawn implement. Fig. 3ª is an enlarged fragmentary plan view taken on line 3ª—3ª on Fig. 3. Fig. 4 is a front elevation of the device shown in Fig. 3. Fig. 5 is a view similar to Fig. 3 illustrating another form of coupling means of the invention. Fig. 6 is a rear elevation of the coupling means shown in Fig. 5. Fig. 7 is a view similar to Fig. 1 showing another form of the invention, and Fig. 8 is a side elevation of the equipment illustrated in Fig. 7 with a portion of the tractor and the coupling means in vertical cross section.

The hitch or coupling means of the present invention may be employed in connection with implement controls of various natures and may be utilized for the control and operation of numerous agricultural implements, etc. In the drawings I have illustrated two forms of the invention associated with an automatic implement control of the character disclosed in the H. G. Ferguson Patents Numbers 1,687,719, 2,118,-180, and 2,118,181, on a typical tractor, and I have shown the coupling means of the invention drawing a conventional disc harrow. The coupling means or hitch of the invention is, of course, useful in association with other controls, implement raising and lowering means, and implement draft means and for the operation or drawing of other implements and the invention is not to be construed as limited or restricted to the specific forms or applications of the invention about to be described. Where the term "drawn implement" is used it is to be construed as meaning any implement, device, or conveyance that may be drawn by the tractor equipped with the coupling means of the invention and whose weight is mainly imposed directly on the earth as distinguished from "carried implements" which are carried by the tractor.

The portion of the typical tractor illustrated in the drawings comprises a rear housing 10 and the usual rear wheels 11. The working parts of the automatic control are enclosed in a housing 12 of the tractor. The exposed parts of the automatic implement governing control include an upper link 13 and a pair of spaced lower links 14. The lower links 14 have their forward ends secured to the tractor structure at stationary pivots 15. The upper link 13 has its forward end pivotally connected to a pivotally mounted bell crank 16 on the tractor. The bell crank 16 is adapted to move a push rod 17 which in turn operates a control valve (not shown) of the automatic control. A compression spring 18 is associated with the push rod 17 to normally urge the same rearwardly. Levers 19, operated by the power means or hydraulic means of the control, are fixed to a shaft 20 to operate in unison and lift rods 21 are operatively connected with the levers 19. The lower ends of the lift rods 21 are pivotally connected with the lower links 14. A manual lever 22 controls the actuating means of the automatic control. The parts thus far described are elements of a conventional tractor and an automatic implement control of the character referred to above.

The harrow illustrated in the drawings comprises two gangs of discs 23 carried by spaced frames or sections 24. The sections 24 are connected by a pivotal connection 25 and a frame 26 so that they may be moved to various angular positions with respect to one another to change the angle of action of their respective discs 23. In the drawings the sections 24 are shown in the "open" position for operation. The usual pull chain or cable 70 is attached to the rear frame 24. A draw bar or tongue 27 is pivotally secured to the forward end of the harrow frame. As illustrated, the forward portion of the harrow frame 26 has a depending part 28 and the rear end of the draw bar or tongue 27 is pivotally secured to this part.

The embodiment of the invention illustrated in Figs. 1 to 4 inclusive, of the drawings may be said to comprise, generally, a frame or yoke 30 carried by and moved by the links 13 and 14, means 31 for connecting the tongue 27 with the yoke 30, and resilient means 32 connected between the yoke 30 and a part of the implement operable to exert a lifting force on the implement and a resultant downward force on the tractor.

The frame or yoke is a generally upright structure carried by the links 13 and 14 for vertical movement and for pivotal movement. While the yoke 30 may be varied considerably I prefer to employ the construction illustrated wherein the yoke comprises two side members 33 and a lower member 34. The side members 33 are opposed parts of similar shape having substantially parallel lower portions 35 and upwardly converging upper portions 36 (see Figs. 3 and 4). Spaced parallel tongues 37 are provided on the upper ends of the portions 36 and the tongues have vertically spaced pairs of openings 38. A bolt 39 is arranged through one pair of openings 38 and has a bushing or spacer 40 for maintaining the spacing of the tongues 37. The rearward end of the link 13 is received between the tongues 37 and a bolt 39a passes through a pair of the openings 38 and an opening in the link to pivotally connect the upper end of the yoke 30 with the link 13. The lower yoke member 34 is a substantially horizontal part received between the parallel lower portions 35 of the side members 33. In practice the member 34 may be a length of pipe or tubular stock and a rod 34a may pass longitudinally through it to project beyond its ends. The rod 34a passes through the openings in the yoke side members 33 and nuts 41 are threaded on the ends of the rod to secure the lower member 34 to the side members 33.

The yoke 30 further includes a horizontal member or transverse member 42 spaced above the lower yoke member 34 and preferably arranged against the rear edges of the parallel portions 35 of the side members 33. The transverse member 42 is suitably fixed to the side members 33. In the construction illustrated collars 43 are welded or otherwise fixed to the inner sides of the portions 35 and bolts 44 pass through openings in the member 42 and extend through the collars 43 to fix the member 42 to the side members 33. The member 42 projects laterally beyond the side members 33 and trunnions 45 are formed on its projecting ends. The trunnions 45 are turnably received in openings in the rear portions of the lower links 14. Thus it will be seen that the member 42 forms an axle or fulcrum for the yoke 30 so that the yoke may pivot about a substantially horizontal axis. It will be observed that the links 13 and 14 and the yoke 30, together with the mountings of the links, form a parallelogram of levers and the operation of the power levers 19 results in an up and down movement of the yoke 30. Further, it is to be noted that the yoke 30 is free to pivot at the trunnions 45 to act as a lever in moving the link 13 back and forth for the operation of the push rod 17.

The means 31 is provided to facilitate the connection of the implement tongue 27 with the lower portion of the yoke 30 so that the drawn implement is connected with the tractor through the medium of the yoke and the draft means or automatic control of the tractor. The means 31 may be varied greatly without departing from the invention. In practice, the means 31 may constitute a pivotal or universal connection between the yoke 30 and the implement tongue 27. In accordance with the invention the tongue 27 is preferably connected with the lower portion of the yoke 30. In the construction illustrated, a tubular block or bearing 47 is arranged on the lower yoke member 34 to turn or pivot at will. Clamps 48 on the member 34 hold the bearing 47 in the selected position on the member 34. A clevis or yoke 50 is formed on the rear portion of the bearing 47 to receive the forward end of the implement tongue 27. A bolt or pin 51 pivotally connects the tongue 27 with the bearing 47 for pivoting about a substantially vertical axis (see Figs. 3 and 3a). The pin 51 may be arranged in an opening 8 in the yoke 50 to pass through a similar opening in the tongue 27. The implement tongue 27 connected with the yoke 30 as just described has the required freedom of movement during operation. The means 31 is such that the tongue 27 may be quickly attached to and detached from the yoke 30. With the tongue 27 connected with the yoke 30 by the means 31 the transmission of force from the yoke 30 to the implement through the tongue 27 alone would cause the lower portion of the yoke 30 to pivot rearwardly so that the link 13 would be moved forwardly to push the rod 17 in the same direction. This, of course, would result in a lifting of the yoke 30 and lifting of the drawn implement.

It may be preferred to loosely or slackly connect the tongue 27 with the yoke 30 so that the tongue and yoke have relative bodily movement under the action of a draft pull when the yoke 30 is normally non-movable with respect to the tractor. This connection provides for the utilization and actuation of the means 32 to exert an upward force on the drawn implement with a resultant downward force on the tractor in situations where the control of the tractor is made inoperative or is not employed. The slack connection also renders the resilient means 32 active for the transmission of a portion of the weight of the drawn implement to the tractor when the yoke 30 is movable by the control of the tractor as above described. The slack connection between the yoke 30 and the drawn implement may be varied greatly. In the simple construction illustrated the slack connection comprises the above mentioned pin 51 cooperating with or received by elongate slots 52 in the yoke or clevis 50. The slots 52 are sufficiently long to allow substantial forward and backward movement of the tongue 27 relative to the yoke 30. The manner in which this movement of the tongue 27 actuates or conditions the means 32 will be later described.

The resilient means 32 is yielding resilient means coupled between the yoke 30 and the drawn implement to share in the transmission of tension between the yoke 30 and the drawn implement and to exert a forward and upward pull on the draw bar or tongue 27 with a resultant downward force on the tractor transmitted through the medium of the yoke 30. The means 32 comprises an extensible spring 55 and means for coupling the spring 55 with the yoke 30 and the tongue 27 or other suitable part of the implement. The spring 55 is preferably a helical spring formed to have a substantial initial tension or resistance to elongation. The spring 55 extends rearwardly from the yoke 30 toward the tongue 27. It is preferred to connect the forward end of the spring 55 to the yoke 30 adjacent the horizontal axis of pivotal movement of the yoke. An eye 56 may be provided on the transverse yoke member 42 to receive the hooked forward end of the spring 55.

The means 32 provides an adjustable coupling element for connecting the rear end of the spring 55 with the tongue 27 of the drawn implement. A hook is formed on the end of the spring 55 to engage in a selected link of a chain 57. The rear end of the chain 55 carries a pin or bolt 9 for connecting the chain with the tongue 27. When slack connection 51—52 is employed the spring 55 is connected between the yoke 30 and the tongue 27 to initially be under a suitable tension so that it urges the tongue 27 forward relative to the yoke 30. By hooking the rear end of the spring 55 through one of the links of the chain 57 the spring 55 may be coupled in the apparatus to have the required normal operating tension. The spring 55 arranged as described normally exerts a forward lifting force on the draw bar or tongue 27 with a resultant forward force on the lower end of the pivoted yoke 30 and offers resistance to a change in the angular relation between the yoke and tongue that results from an upward movement of the yoke 30.

In the operation of the apparatus illustrated in Figs. 1 to 4, inclusive, it may first be assumed that the tractor is idle or standing with the parts of the apparatus in the positions illustrated in Figs. 1 and 2 and that the draft control or implement control of the tractor is conditioned for operation. With the parts in this condition the tension of the spring 55 puts a lifting force on the drawn implement through the medium of the draw bar or tongue 27, and because of the connection 8—51 between the tongue 27 and the lower end of the yoke 30, the spring may exert a forward force on the lower end of the pivoted yoke 30. This latter force tends to pivot the yoke 30 so that the upper arm of the yoke moves rearwardly to allow the push rod 17 to move rearwardly. When the tractor begins its forward movement a forward force considerably larger than the tension being exerted by the spring 55 must be applied to the tongue 27 to advance the harrow or implement. When the forward movement of the tractor results in a force component at the lower end of the yoke 30 directed rearwardly and of considerably greater intensity than the forward force exerted at this point by the spring 55, the yoke 30 pivots on its trunnions 45 in response to the application of this increased force and the upper portion or arm of the lever-like yoke 30 moves forwardly to cause forward movement of the push rod 17. Forward movement of the push rod 17 actuates the automatic control of the tractor and the levers 19 are operated to lift or raise the yoke 30. This raising of the yoke 30 produces a change in the direction of the pull applied to the drawn implement and the implement discs 23 are given a leading upward pull which tends to take them out of the ground. This reduces the draft or pull necessary for the operation of the drawn implement. The upward movement of the yoke 30 by operation of the automatic control links 19 also increases the tension on the spring 55 so that the spring produces an increase in its forward force component at the lower end of the pivoted yoke 30 and an increase in the lifting force on the drawn implement and the resultant downward force on the tractor. It will be observed that the draw bar or tongue 27 constitutes a lever considerably longer than the portion of the yoke 30 below the trunnions 45 and the spring 55, coupled with this long lever, is given a substantial mechanical advantage or leverage.

When the discs 23 have been drawn or led out of the earth to the extent that the resistance offered by the discs is substantially reduced, the spring 55, acting through the medium of the tongue 27, pivots or tends to pivot the yoke 30 so that the forward push on the rod 17 is relieved and the automatic control may permit a downward movement of the yoke or may merely stop the upward movement of the yoke. Thus the apparatus operates to maintain a substantially uniform pulling load on the tractor, this load being governed by the setting of the manual control part 22.

In the event that the drawn implement encounters obstructions or soil that offers increased resistance to its advancement the tension on the hitch or coupling means is, of course, increased and the increased draft or pull transmitted through the coupling of the tongue 27 with the lower end of the yoke 30 will result in a forward movement of the upper portion of the yoke and a forward force on the push rod 17. This puts the automatic control in operation and the levers 19 are actuated to lift the yoke 30. Raising of the yoke 30 results in an upward forward pull on the tongue 27 and reduces the bite or depth of cut of the discs 23. So long as the harrow is operating in earth offering increased resistance to its advancement the yoke 30 may remain raised. However, when the drawn implement again encounters soil offering a less resistance the yoke 30 pivots to its former position under the action of the spring 55 and the depth of cut of the discs 23 is increased. It will be observed that the implement coupling means or hitch of the invention adapts the control of the tractor for the operation of harrows and other drawn implements whose principal resistance to advancement is generally horizontal and utilizes a part of the weight of the drawn implement to increase the load on the tractor and thus increase the traction of the tractor.

In the operation of the apparatus where the control of the tractor is made idle by the control part 22, or otherwise, or where the yoke is normally immovable on the tractor, the pin 51 is arranged through the slots 52 and a suitable opening in the tongue 27 and the spring 55 is adjusted or arranged to normally exert a substantial forward force on the tongue 27. It may be assumed that the tractor is standing and that the tongue 27 is held forward by the spring 55 so that the pin 51 is in its forward position in the slots 52. When the tractor starts forward, a pull, considerably greater in magnitude than the forward force exerted on the tongue 27 by the spring 55, must be applied to the tongue 27 to advance the drawn implement. This heavier force (the draft pull) overcomes the action of the spring 55 and results in forward movement of the yoke 30 relative to the tongue 27 and the pin 51 is received in the rear portions of the slots 52. The relative movement between the yoke 30 and the tongue 27 is resisted by the spring 55 and the spring in effect exerts an increased lifting force on the drawn implement and downward force on the yoke. Thus relative movement between the yoke 30 and the implement tongue 27 results in the transmission of a portion of the weight of the drawn implement to the tractor through the medium of the coupling of the invention to increase the traction of the tractor. The spring 55 may or may not be able to exert a sufficient lifting force on the drawn implement to lead its discs 23, or active parts, out of the earth to relieve or lessen the draft on the tractor, this depending upon the character and setting of the implement, the character of the soil and other operating factors. In any case, the coupling, including the connection 51—52, allowing relative movement between the yoke 30 and the tongue 27, and including the spring 55 applies a portion of the weight of the drawn implement to the tractor to increase the tractor traction.

Figs. 5 and 6 illustrate a form of the invention embodying an alternative or modified spring means 32ª for exerting a lifting force on the tongue 27 and a resultant forward force on the lower end of the pivoted yoke 30 and for resisting a change in the angular relation between the yoke 30 and the tongue 27 that results from raising of the yoke.

The means 32ª includes a swinging frame or bracket associated with the yoke member 34 and the yoke member 42. The bracket may include an arm 80 having a link connection or swinging connection 80ª with the intermediate yoke member 42 and an arm 81 joining the outer end of the arm 80 and extending downwardly and forwardly to the lower end of the yoke 30. The forward or lower end of the arm 81 has a suitable connection 82 with the bearing 47 on the lower yoke member 34. A horizontal opening 83 is provided in the bracket where the arms 80 and 81 join.

The means 32ª further includes a spring 55ª connected with the tongue 27 and the above described bracket. The spring 55ª is preferably an extensible helically wound spring formed to offer substantial resistance to elongation. The hooked upper end of the spring 55ª is engaged in the bracket opening 83 and the spring extends downwardly from the bracket toward the implement tongue 27. A sleeve 84 may be provided on the tongue 27 and may carry an eye 85 for receiving the hooked lower portion of the spring 55ª. The sleeve 84 may be suitably secured to the tongue 27 in a position where the spring 55ª is normally tensioned as required and where the spring 55ª is substantially vertical. The sleeve 84 may be adjusted to various positions as desired.

The operation of the structure illustrated in Figs. 5 and 6 is substantially the same as that of the previously described form of the invention. The spring 55ª exerts an upward force on the tongue 27 under normal operating conditions and operates to resist any increase in the angle between the yoke 30 and the tongue 27. In the event the draft pull transmitted by the hitch or coupling is increased the yoke 30 pivots so that its lower end swings rearwardly and the yoke 30 is raised by the control, as described above. This raising of the yoke 30 is resisted by the spring 55ª and when the condition that caused raising of the yoke 30 is relieved or terminated the spring 55ª acting on the tongue 27 restores or tends to restore the yoke 30 and the tongue 27 to their former positions.

Figs. 7 and 8 of the drawings illustrate a form of the invention embodying still another form of spring means 32ᵇ and a means 65 operable to control the angle or disposition of the active parts or discs 23 of the drawn implement, said means being responsive to vertical movement of the yoke 30 resulting from variations in the required draft pull on the implement.

The means 32ᵇ is similar to the means 32 shown in Figs. 1 to 4, inclusive, including an angularly disposed spring 55ᵇ sharing in the transmission of the draft pull between the yoke 30 and the drawn implement and resisting a change in the position of the yoke 30. The means 32ᵇ includes a link 86 connected with the lower part of the yoke 30. It is preferred to secure the link 86 to the yoke 30 by a universal connection to allow the required freedom of movement of the link and the drawn implement. In the case illustrated a plate 87 is fixed to the lower member 34 of the yoke 30 at a point between the ends of the member and projects rearwardly from the yoke 30. A clevis or yoke 88 engages about the projecting rear portion of the plate 87 and is connected with the plate by a vertical pivot pin 89. The clevis or yoke 88 has a notched or forked rear portion receiving the forward end of the link 86. A pin 90 on the link 86 cooperates with the yoke 88 to pivotally connect the link and the yoke. The pin 90 is substantially horizontal. The link 86 extends upwardly and rearwardly from its point of connection with the yoke 30 and is provided with suitable means for connecting with the tongue 27 of the implement. In the construction illustrated a clamp 91 is provided on the upper or rear end of the link 86 to rigidly connect the link with the tongue 27. The parts may be related as illustrated so that the link 86 slopes upwardly and rearwardly and the tongue 27 slopes downwardly and rearwardly.

The yielding means 32$^b$ comprises the above-mentioned spring 55$^b$ which is connected between the yoke 30 and the link 86. The spring 55$^b$ is an extensible coiled spring constructed to offer substantial resistance to elongation. The forward end of the spring 55$^b$ may be hooked through an eye 92 on the yoke 30. The eye 92 is preferably provided on the transverse yoke member 42 to be adjacent the pivotal axis of the yoke 30. The rear end of the spring 55$^b$ may be hooked over a pin 93 on the link 86. The parts are related so that the spring 55$^b$ is under tension during normal operating conditions to exert an up pull on the tongue 27 and a resultant forward force on the lower end of the pivoted link 30.

The alternative or modified spring means 32$^b$ of Figs. 7 and 8 operates in substantially the same manner as the structure illustrated in Figs. 1 to 4, inclusive. During operation of the tractor and drawn implement the parts of the apparatus assume positions where the spring 55$^b$ is under tension to exert an up pull on the tongue 27 and a resultant forward force on the lower end of the yoke 30. When the draft pull transmitted by the hitch or coupling increases the yoke 30 pivots and the rear portion of the yoke swings rearwardly. This pivoting of the yoke 30 is accompanied by upward movement of the yoke produced by the automatic control on the tractor. The spring 55$^b$ resists the upward movement of the yoke 30 and when the draft pull on the hitch or coupling lessens or returns to normal the spring 55$^b$ returns or tends to return the yoke 30 to its former position by exerting a forward thrust on the lower end of the yoke. The coupling means illustrated in Figs. 7 and 8 is effective in utilizing a portion of the weight of the drawn implement to increase the traction of the tractor.

The means 65 is actuated by vertical movement of the yoke 30 resulting from the action of the automatic control to maintain the draft pull on the drawn implement substantially uniform. The means 65 is also useful in automatically closing the harrow sections 24 for the purpose of taking the harrow "home" and for making turns. A bracket 66 is secured to the transverse member or lower member 34 of the yoke 30 and projects forwardly at the lower end of the yoke. The means 65 further includes a bell crank 67 mounted on the bracket 66. A suitable pivotal mounting 68 attaches the bell crank 67 to the bracket 66 for pivotal movement about a substantially horizontal axis. The forward arm of the bell crank 67 is provided with a shoe 69 engageable with the tractor housing 12 or any other selected part of the tractor. The rear arm of the bell crank 67 projects upwardly and rearwardly. The pull chain or pull cable 70 for closing the sections 24 of the harrow and for governing the angular disposition of the harrow discs 23 is suitably connected with the rearwardly projecting arm of the bell crank 67.

The bell crank 67 is formed and mounted to remain clear of the housing 12 during normal operation and while the yoke 30 is in an average working position. When the yoke 30 is moved upwardly beyond a given position the shoe 69 comes into contact with the housing 12 and in the event the upward movement of the yoke 30 is continued, because of a change in the character of the soil or for other reasons, the bell crank 67 pivots and exerts a pull on the line or cable 70. The pull on the cable 70 results in pivoting of the harrow sections 24 to bring their discs 23 to positions where they are at a smaller angle to the direction of travel. This reduces the draft required to operate or pull the implement. When the yoke 30 moves downwardly as a result of this action or because of a change in the character of the soil the bell crank 67 pivots in a reverse direction and the harrow sections 24 move apart or return to their former positions. When it is desired to make a right hand turn with the harrow or to transport the harrow or to take the harrow home, the manual control part 22 may be operated to raise the yoke 30. This lifting of the yoke 30 brings the shoe 69 into contact with the housing 12 and causes pivoting of the bell crank 67. The bell crank exerts a pull on the cable 70 to close the harrow sections 24 thus bringing the discs 23 to positions where they are substantially aligned with the direction of advancement of the implement. The apparatus illustrated in Figs. 7 and 8 of the drawings embodies a novel means 65 that controls the disposition or angle of action of the active parts of the implement to automatically reduce the resistance to advancement offered by said parts when the parts encounter obstructions or hard soil.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. In combination, a tractor, a drawn implement unsupported by the tractor so that its weight is imposed on the ground, a draft tongue for the implement pivotally connected at its forward part with the tractor and a resilient coupling between the tractor and the tongue urging the tongue to swing upwardly about its point of pivotal connection with the tractor to exert a lifting force on the implement and a downward force on the tractor.

2. In combination, a tractor, a drawn implement unsupported by the tractor, and a structure for connecting the implement with the tractor extensible under a draft pull resulting from advancement of the tractor, said structure including a tongue for the implement, means for pivotally connecting the tongue with the tractor, and a resilient part coupled between the tongue and tractor operable upon pivoting of the tongue about the axis of the last named means for exerting a lifting force on the tongue to assume a part of the weight of the implement and to impose a down force on the tractor.

3. Means for coupling a drawn implement which is supported on the ground with a tractor, said means comprising a draft tongue for the implement, means for connecting the tongue with the tractor to pivot about a normally fixed axis, and resilient means for assisting in the transmission of the draft pull urging the tongue to pivot upwardly about said axis and exerting a lifting force on the implement and a down force on the tractor.

4. A coupling for connecting a drawn implement which is supported directly on the ground with a tractor, the coupling comprising a draft tongue for the implement pivotally connected with the rear part of the implement at a point below the plane occupied by the axle of the adjacent tractor wheel, and a spring connected with the tongue at a point rearward of the first named point and extending upwardly and forwardly for connection with the tractor to exert a lifting force on the tongue.

5. A coupling for connecting a drawn implement which is supported directly on the ground with a tractor comprising a draft tongue for the implement pivotally connected with the rear part of the tractor at a point below the plane occupied by the axle of the adjacent tractor wheel, a spring, and means for connecting the spring with the tractor and tongue to urge the tongue to swing upwardly about the second named point and thus exert a lifting force on the implement and a downward force on the tractor, at least one of said means being adjustable to vary the intensity of said forces.

6. Means for coupling a drawn implement whose weight is directly imposed on the ground with a tractor, said means comprising a structure for connecting the implement with the tractor to be drawn thereby and allowing relative movement between the tractor and implement when subjected to a draft pull, and resilient means operable upon the occurrence of such relative movement to impose a portion of the weight of the implement on the tractor.

7. A coupling for connecting a drawn implement whose weight is directly imposed on the ground with a tractor, the coupling comprising a draft tongue pivotally secured to the implement, means for pivotally connecting the tongue and the tractor allowing relative movement between the tongue and the tractor upon advancement of the tractor, and means actuated by said relative movement to transfer at least a portion of the weight of the implement to the tractor.

8. A coupling for connecting a drawn implement whose weight is directly imposed on the ground with a tractor, the coupling comprising a draft part for the implement, means for connecting the draft part with the tractor for relative movement and for the transmission of the draft pull between the tractor and the implement, said relative movement occurring as a result of the draft pull and a spring associated with the draft part operable by said relative movement to apply a portion of the weight of the implement to the tractor.

9. Means for coupling an implement with a tractor having an implement control for maintaining the implement draft load on the tractor substantially uniform, the control embodying a movable part controlling its action, said means including a structure pivotally carried by the control for vertical movement thereby and adapted by reason of its pivotal movement to produce actuation of said control part, means for connecting the implement with said structure so that the implement is drawn by the tractor and so that vertical movement of said structure varies the working depth of the implement, and spring means coupled between said structure and said means tending to pivot said structure in a direction to produce lowering of said structure by the action of the control.

10. In combination with an implement control of a tractor operable to vary the cutting depth of the implement and controlled by a movable control part, a structure pivotally carried by the control for substantially vertical movement thereby and adapted by reason of its pivotal movement to operate the control part, means for connecting the implement with said structure so that the draft pull transmitted by the means tends to pivot said structure in a direction to cause upward movement of said structure by the control, and yielding means resisting such pivoting of said structure.

11. In combination with an implement control of a tractor controlled by a movable control part, a structure pivotally carried by the control for substantially vertical movement thereby and adapted by reason of its pivotal movement to operate the control part, means for coupling the implement with said structure so that the draft pull tends to pivot said structure in a direction to cause upward movement of said structure by the control, and an extensible tension spring connected between said structure and said means to exert an upward force on said means which tends to pivot said structure in the opposite direction to cause downward movement of said structure by the control.

12. A device for coupling an implement having a tongue with an implement control of a tractor, controlled by a movable control part, the device including a generally upright element pivotally carried by the control to pivot about an axis spaced between its upper and lower ends and to be moved vertically by the control, the element being adapted by reason of its pivotal movement to operate the control part, means for coupling the implement tongue with the element at a point below said axis whereby the draft pull tends to pivot the lower portion of the element rearwardly so that the element actuates the control to produce upward movement of the element and thereby exert a raising force on the implement, a tension spring connected with the element, and adjustable means for connecting the spring with the implement tongue whereby the spring exerts a forward force on the lower portion of the element to normally maintain the element in a position where the implement imposes a selected draft load on the tractor.

13. Apparatus for coupling a drawn implement having an earth engaging part whose angle of action may be varied to a tractor having a control for raising the coupling governed by a control part; the apparatus comprising a yoke, means supporting the yoke on said control to be moved vertically thereby and to pivot about an axis spaced between its ends to operate the control part, means for coupling the yoke with the implement to pivot in response to variations in the draft pull necessary to operate the implement and thus produce vertical movement of the yoke, and means operated by vertical movement of the yoke for moving the earth engaging part about a generally vertical axis to change the angle of action of the said earth engaging part.

14. In combination with an implement control of a tractor including spaced lifting links and a control part movable to produce vertical movement of the lifting links, a yoke carried by the lifting links to pivot about a substantially horizontal axis, a connection between the yoke and the control part whereby pivoting of the yoke operates the control part to move the yoke vertically, and means for coupling an implement with the yoke whereby variations in the draft pull required to operate the implement may pivot the yoke, said means including a member pivotally connected with the yoke at a point spaced below its pivotal axis and extending rearwardly from the yoke, means for coupling the rear portion of the member with the implement, and yielding means urging the member to pivot upwardly and forwardly.

15. A device for coupling an implement having a tongue with an implement control of a tractor controlled by a movable control part, the device including a generally upright element pivotally carried by the control to pivot about an axis spaced between its upper and lower ends and to be moved vertically by the control, the element being adapted by reason of its pivotal movement to operate the control part, means for coupling the implement tongue with the element at a point below said axis whereby the draft pull tends to pivot the lower portion of the element rearwardly so that the element actuates the control to produce upward movement of the element and thereby exert a raising force on the implement, a rearwardly projecting bracket on the lower portion of the element, and a spring on the bracket adapted to be connected with the implement tongue to resist said rearward pivoting of the lower portion of the element.

16. A device for coupling an implement having a draft tongue with an implement control of a tractor controlled by a movable control part, the device including a yoke at the rear of the tractor, means connecting the yoke with the control to be moved vertically by the control and to pivot about a generally horizontal axis spaced between its upper and lower ends to operate said control part, means for connecting the draft tongue with the lower portion of the yoke to extend rearwardly from the yoke, a spring attached to the yoke and extending rearwardly and downwardly therefrom, and means for adjustably connecting the spring with the tongue to exert an upward and forward force on the tongue.

17. Apparatus for coupling a drawn implement whose weight is directly imposed on the ground to a tractor having vertically movable draft means, the apparatus including a part pivotally secured to said draft means to move therewith and to be vertically pivotable thereon, means for pivotally coupling the implement with said part so that the draft pull is transmitted through said part from the tractor to the implement, and resilient means for transferring a portion of the weight of the implement to the tractor upon vertical pivotal movement of the part relative to the tractor and implement.

18. Apparatus for coupling a drawn implement whose weight is normally entirely imposed on the ground to a tractor having vertically movable draft means, the apparatus including a part secured to said draft means to move therewith, and means for coupling the implement with said part comprising a member pivotally connected with the implement and pivotally connected with said part, and spring means resisting relative pivotal movement of said part and member in one direction operable to transfer a portion of the weight of the implement to the tractor.

19. Apparatus for coupling an implement to a tractor having vertically movable draft means and a control for moving the draft means, the apparatus including a part secured to the draft means to move therewith and to pivot thereon, a connection between the part and control whereby pivoting of the part operates the control, a draft-pull transmitting means for connecting the part with the implement whereby the draft-pull tends to pivot the part to cause upward movement of the draft means and part by the control, and spring means associated with said pull transmitting means to yieldingly resist the effect of an increased draft-pull on the control and to exert an upward force on the implement when the part is elevated by the control.

20. Apparatus for coupling an implement having an earth engaging member whose angle of action may be varied to a tractor having a vertically movable draft means, the apparatus comprising a part movable by the draft means, a coupling between the part and the implement whereby the implement is drawn by the tractor, two elements, one on the tractor, the other on the part, one element being moved by the other when the part is raised beyond a given point, and a connection between said movable element and the earth engaging member whereby the angle of the member is changed when the part is raised beyond said point.

FREDERICK VON SCHLEGELL.